June 30, 1942.  R. R. HAUGH  2,287,995
APPARATUS AND METHOD FOR CONDENSING LIQUIDS
Filed Dec. 16, 1939   2 Sheets-Sheet 1
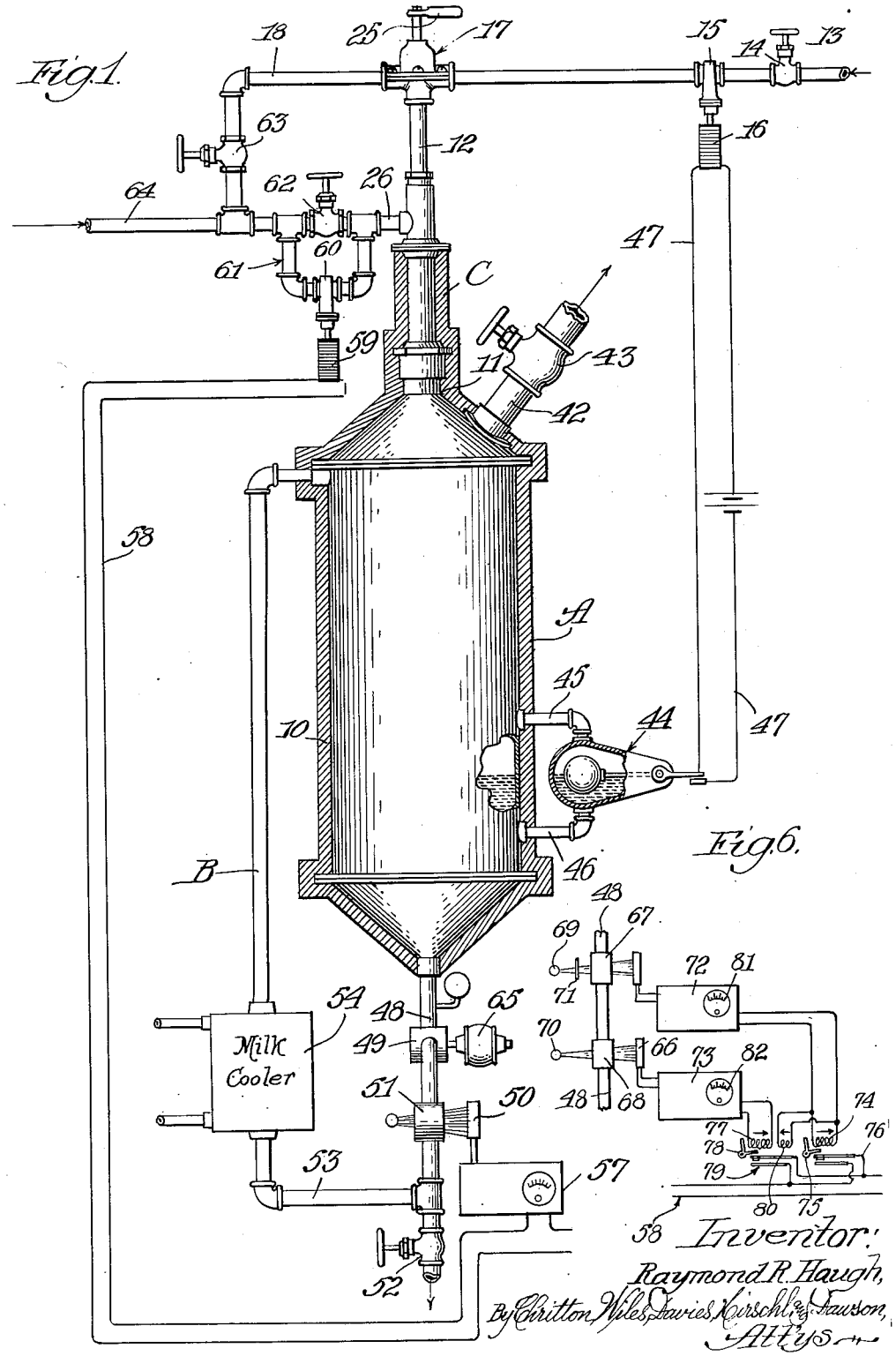

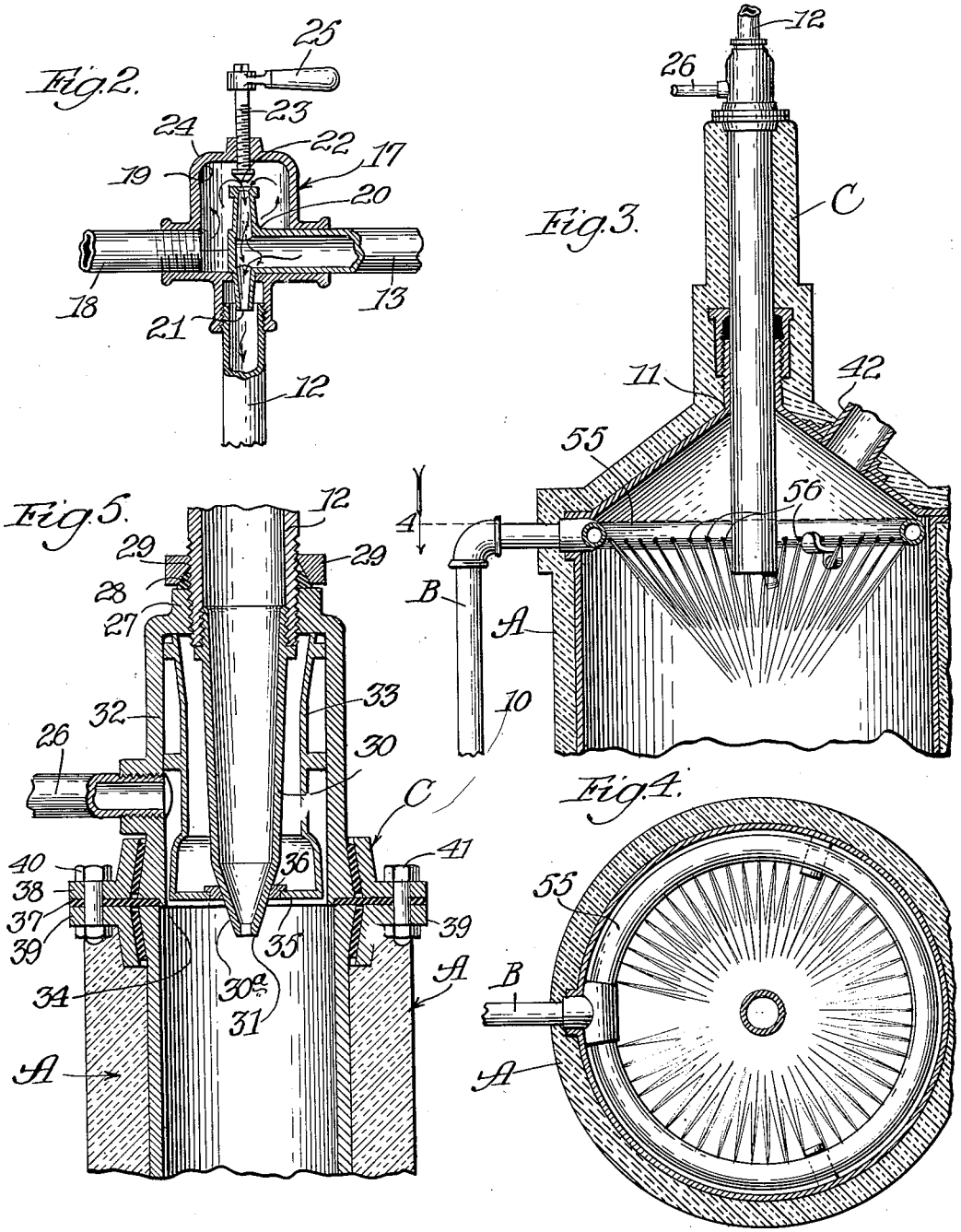

Patented June 30, 1942

2,287,995

UNITED STATES PATENT OFFICE 2,287,995

APPARATUS AND METHOD FOR CONDENSING LIQUIDS

Raymond R. Haugh, Chicago, Ill., assignor to Vernon C. Usher, Chicago, Ill.

Application December 16, 1939, Serial No. 309,689

6 Claims. (Cl. 159—4)

This invention relates to an apparatus and method for condensing liquids, and more particularly for a simple means of condensing liquids such as milk by evaporation of the moisture therein.

One object of the invention is to provide apparatus by which moisture may be evaporated from liquids without burning, charring, or carbonizing the same. Another object is to evaporate liquids without causing foaming or effervescence of the liquid body. Another object is to provide means for quick or instantaneous evaporation of a portion of the liquid without changing to any extent the properties of the remaining liquid except the viscosity thereof. Another object is to provide for the sterilization of liquids in conjunction with the condensing of the same. Still another object is to provide for recirculation and retreatment of the liquid to be evaporated. Yet another object is to provide an automatic control for the means for heating the liquid, which control will be dependent for its operation upon the viscosity of the liquid. Another object is to produce by evaporation a smooth homogeneous condensed liquid having a uniform color and viscosity. A further object is to provide improved means for mixing a liquid with superheated steam. Other objects and advantages will be apparent from the following specification and drawings, in which:

Figure 1 is a side elevational view of my apparatus partly broken away and in section; Figure 2 is a detailed view, partly in section, of a valve and mixing chamber; Figure 3 is a longitudinal sectional view of a portion of the container; Figure 4 is a sectional view, taken along the line 4 of Figure 3; Figure 5 is a longitudinal sectional view of the inlet system associated with the container; and Figure 6 is a view, partly diagrammatic, of a modification of a portion of the apparatus shown in Figure 1.

Although my invention is broadly useful for evaporating or condensing liquids, it is particularly adapted for sterilizing and condensing milk. In the preparation of evaporated or condensed milk certain difficulties are normally encountered. For example, precaution must be used in heating the milk in order to avoid burning or carbonizing the same. Such burning of the milk is usually due to local heating effects in which the walls of the container are raised to a temperature considerably in excess of the temperature of the milk itself. Another difficulty commonly encountered is that of preventing the milk from forming and effervescing when evaporated under vacuum. These and other difficulties are reduced and eliminated by my invention.

In the specific embodiment of my invention disclosed herein, a container A is associated with a recirculating pipe B, and an inlet system C. The container A may be of any suitable size or shape and is preferably covered with insulation 10.

An aperture 11, preferably in the upper end of the container A, communicates with the inlet system C. A conduit 12 serves to introduce the liquid to the inlet system C and in turn is connected to a pipe 13 communicating with the source of the liquid (not shown). The pipe 13 is provided with a manually controlled valve 14 and a second valve 15 controlled by the solenoid 16.

The valve 17, as seen particularly in Figure 2, permits the connection of the pipes 12 and 13 to the steam inlet pipe 18. A chamber 19 at the end of the steam inlet pipe 18 communicates with the opening 22 in the T-shaped extension 20 of the pipe 13. The other opening 21 in the extension 20 connects the valve to the pipe 12. The opening 22 may be closed by member 23 threadedly received in the housing 24. This member 23 is provided with a handle 25 by means of which the valve may be manually controlled.

As seen particularly in Figure 5, the pipe 12 leads to the inlet system C, which also receives a steam inlet pipe 26. The liquid inlet pipe 12 is threadedly secured to the casing 27 and held in position by a washer 28 and lock nut 29. A reduced extension 30 is threadedly secured to the inside portion of the pipe 12 and is provided with inwardly tapered end 30a and a small jet opening 31.

The pipe 26 is threadedly secured in the side of the casing 27, communicating with a chamber 32 which is formed by the casing 27 and the annular insulating member 33. The insulating member 33 is so arranged as to provide at its lower end a small annular opening 34 through which the steam may pass from the chamber 32 into the container A. The lower portion of the insulating member 33 is also equipped with an inwardly turned flange 35 which engages a supporting ring 36 on the lower portion of the extension 30.

The casing 27 may be joined to the container A in any suitable manner. As shown, the junction is made by a rubber or felt washer 37 secured in position by flanged rings 38 and 39 which in turn are attached to each other by bolts 40 and 41.

This inlet system C is described and claimed in my copending application entitled "Heating method and apparatus," filed December 16, 1939, Ser. No. 309,691, and will not be described in greater detail herein.

The container A may be equipped with a connecting pipe 42 to which is attached a valve 43. This connection may be used to evacuate the container A, or, on the other hand, to raise the pressure within the container above atmospheric.

The lower portion of the container A is adapted to collect and receiver liquid which has been previously treated. A float valve 44 may be connected to the lower portion of the container A by the pipes 45 and 46, and by means of the circuit 47 may operate the solenoid 16 and valve 15 to shut off the flow of liquid through the pipe 13 when the liquid in the container rises above a predetermined height.

The lower end of the container A is provided with a draw-off pipe 48 to which is attached a pump 49 and motor 65. The pipe 48 is also equipped with a transparent window portion 51 which permits the use of a photoelectric cell 50 for determining the viscosity of the liquid within the pipe. A valve 52 is provided to enable the operator to draw off the liquid which has been condensed to the proper viscosity.

The draw-off pipe 48 is connected by the pipe 53 to the recirculating pipe B which may pass through a cooler 54 of any conventional type. As seen particularly in Figure 3, the recirculating pipe B enters the upper portion of the container A and joins a pipe 55 provided with a series of small holes 56 through which the liquid may be sprayed.

The photoelectric cell 50 is connected to a galvanometer 57 and a circuit 58 by means of which the solenoid 59 is actuated when the viscosity of the liquid passing before the window 51 becomes greater than a predetermined amount. The valve 60 in the steam inlet by-pass 61 is operated by the solenoid 59. The valve 62 on the other side of the by-pass 61 is manually controlled as is the valve 63 in the pipe 18.

In the modification of the means for controlling the viscosity of the liquid as shown in Figure 6, the apparatus is provided with a pair of photoelectric cells 65a and 66. The draw-off pipe 48 is then provided with a pair of transparent windows 67 and 68, which receive light from the lamps 69 and 70, respectively. The light passing through the window 67 to the cell 65a is passed through a color filter 71, which may be red or any other suitable color.

The photoelectric cells 65a and 66 are connected to the direct current photoelectric cell amplifiers 72 and 73, which are so constructed that the output increases as the input decreases. The construction of such amplifiers is so well known that it is believed unnecessary to either show or describe the same in detail herein. In the amplifiers may be placed galvanometers 81 and 82 for indicating the quantity of current passing through the circuit.

The amplifier 72 is in turn connected to the solenoid 74, which is adapted to actuate the contact pin 75 to close the switch 76. The contact pin 75 is continuously and uniformly restrained against such movement by a suitable spring (not shown) of the type commonly used for such purpose, whereby the switch 76 will be closed only when the current passing through the solenoid 74 exceeds a predetermined amount. The amplifier 73 is connected to the solenoid 77, which is adapted to actuate the contact pin 78, closing the switch 79. The solenoid 80 in the circuit of the amplifier 72 opposes the solenoid 77 so that the switch 79 will be closed only when the difference in quantities of current passing through the two circuits exceeds a predetermined amount. The switches 76 and 79 are so arranged that the closing of either will close the circuit 58 and operate the solenoid 59.

In operation, the milk which it is desired to condense is brought into the apparatus through the pipe 13 past the valves 14 and 15 into the valve 17 associated with the chamber 19. At this point steam, preferably superheated to the neighborhood of 400° F., is brought into the chamber 19 and mixed with the liquid in the pipe 13. The steam is obtained through the pipe 18, the valve 63, and the steam inlet pipe 64. Preferably only enough steam is mixed with the liquid to raise the temperature of the liquid to approximately 180° or 190° F., since at higher temperatures the milk will deteriorate. The quantity of steam introduced may be controlled by manual adjustment of the valve 63.

The mixture of milk and steam is passed through the opening 21 to the pipe 12 into the extension 30 and down through the small opening 31 into the container A. Simultaneously steam from the pipe 64 is received through the valves 60 and 62 into the pipe 26, the chamber 32, and finally the opening 34 into the container A. The smallness of the opening 34 causes the steam to be passed into the container A at a relatively high velocity, and, since the steam surrounds the jet of milk ejected from the opening 31, the milk is prevented from reaching the walls of the container A.

If desired, the milk may be introduced to the pipe 12 under pressure. In this event the milk will be ejected from the small opening 31 under pressure and will be dispersed into small particles in the form of a spray. In this manner, a much more intimate mixture of the milk with the steam ejected from the opening 34 is accomplished, and accordingly a much more rapid and smooth evaporation is possible.

The mixing of the superheated steam with the liquid causes the moisture of the liquid to be evaporated as the steam is cooled down to the condensation point, or, in other words, as the steam is desuperheated.

A suitable evacuating means may be attached to the pipe 42 to draw off the moisture and desuperheated steam from the container A. At the same time the maintaining of the container A under a vacuum or reduced pressure will facilitate the evaporation of the liquid. When the container A is maintained under a vacuum, it is possible to accomplish evaporation of the milk at a much lower temperature than is otherwise possible. For example, under a vacuum of approximately twenty-seven inches the milk may be rapidly evaporated at a temperature of 80° F.

On the other hand, if it is desired to prevent foaming, frothing, and effervescence of the liquid while maintaining the same at a high temperature such as 212° F., or more, the pipe 42 may be used to introduce and maintain a superatmospheric pressure within the container A.

The condensed milk or liquid is collected in the lower end of the container A and is driven by the pump 49 through the pipe 48 to the pipe 53 through the recirculating pipe B and back into the container A through the spray 56 in the pipe 55. The pipe 55 in the container A is arranged in such a manner that the milk which is sprayed therefrom surrounds the mixture of steam and milk which is being introduced into the container and mixes therewith.

When the milk and superheated steam are intermixed, the milk is rapidly evaporated and is obtained in a condensed form. By means of the recirculating system, milk may be further subjected to treatment with the superheated steam and further condensed. The use of the pipe 55 with the series of apertures 56 enables the recirculated milk to be sprayed into the superheated steam mixture and a more rapid evaporation obtained.

Since the condensation or evaporation of the milk is to a large extent proportional to its viscosity, and since the opacity of milk in the course of the ordinary condensation is directly proportional to its viscosity the photoelectric cell 50 is used to determine the extent to which the milk has been condensed. When the milk reaches a predetermined opacity indicating the desired viscosity, the photoelectric cell 50 acts to operate the solenoid 59, shutting off the valve 60 and decreasing the steam admitted to the container. In this manner, the viscosity of the milk in the container will reach a constant value and will be maintained at such value.

The opacity of the milk varies of course with the color as well as with the viscosity. It has been found that the changes in opacity are directly proportional to the sum of the changes in viscosity and color. Accordingly, when the photoelectric cell is used as above, the operation of the solenoid 59 will be affected by changes in color as well as in viscosity and the regulation of viscosity by this means is not extremely accurate. This defect may be remedied by providing a pair of photoelectric cells one of which is provided with a color filter and is not affected by the changes in color of the solution.

Instead of this photoelectric cell mechanism the viscosity and color control means shown in Fig. 6 may be used. In the modification shown in Fig. 6, the photoelectric cell 65a receives light from the lamp 69, after which it is passed through the color filter 71 and the liquid in the pipe 48. Because of the color filter, changes in the color of the liquid will not affect the light received or current generated by the cell 65a. Therefore, the current delivered from the cell 65a to the solenoid 74 will vary directly with the changes in the viscosity of the liquid. When, as a result of the current from the photoelectric cell 65a, the solenoid 74 exerts a sufficient pull to move the contact pin 75 to close the switch 76, the solenoid 59 is energized through the circuit 58.

The photoelectric cell 66, on the other hand, receives light from the lamp 70, which light is affected by changes in either color or viscosity of the liquid. The current which flows through the solenoid 77, therefore, varies with the sum of the changes in viscosity and color of the liquid. This solenoid is opposed to the solenoid 80 which is dependent upon the changes in viscosity alone. The result of the combined action of the solenoids 79 and 80 is to cause the switch 79 to be closed when the color of the liquid changes by a predetermined amount.

It is, of course, also possible to use any other suitable means for measuring the changes in viscosity and color of the liquid and for automatically regulating the heating of the liquid to maintain these properties at uniform predetermined values.

By means of the float valve 44, the introduction of milk into the container A is stopped when the amount collected in the bottom portion of the container reaches a predetermined quantity.

While there are shown and described certain embodiments of the invention, it is to be understood that it is capable of many modifications. Changes, therefore, in the construction and arrangement may be made without departing from the spirit and scope of the invention as disclosed in the appended claims, in which it is intended to claim all novelty inherent in the invention as broadly as permissible, in view of the prior art.

I claim:

1. A method of condensing liquids which comprises mixing said liquid, in the form of finely divided particles, with superheated steam, collecting the treated liquid, dispersing the treated liquid into small drops and adding the same to the mixture of steam and liquid.

2. A method of condensing liquids which comprises mixing said liquid in the form of small drops with steam, said steam being superheated to approximately 400° F., collecting the treated liquid, removing the desuperheated steam, dispersing the treated liquid into small drops and adding the same to the mixture of superheated steam and liquid.

3. A method of condensing liquids which comprises mixing said liquid with superheated steam, collecting the treated liquid, dispersing the treated liquid into small drops and adding the same to the mixture of superheated steam and liquid.

4. A method of condensing liquids which comprises providing a mixing chamber, simultaneously introducing liquid and superheated steam into the chamber to mix the same, collecting the liquid which has been treated with superheated steam, recirculating at least a portion of the treated liquid, dispersing the treated liquid into finely divided particles, and adding the same to the mixture of superheated steam and liquid.

5. Apparatus for condensing liquids, comprising a container, an inlet conduit communicating with the upper end of the container, means for introducing steam into said conduit, a liquid inlet for introducing liquid into said conduit to mix the same with said steam whereby the mixture of steam and liquid may pass into the container, the lower end of the container being adapted to collect and receive the treated liquid, a conduit communicating with the lower and upper ends of said container, means for passing said liquid through said conduit from the lower to the upper end of said container, means for passing liquid from said conduit into the container in the form of finely divided particles and for mixing the particles with the steam and liquid mixture within said container.

6. Apparatus for condensing liquids, comprising a container, an inlet conduit communicating with the upper end of said container, a liquid inlet for introducing the liquid to be condensed into said container, a jet for introducing steam into said conduit around said liquid inlet to mix the same with the liquid in the conduit, said conduit being arranged to carry the mixture of steam and liquid into the container, the lower end of the container being adapted to collect and receive treated liquid, a recirculating conduit communicating with the lower and upper ends of said container, means for passing liquid through said recirculating conduit from the lower to the upper end of the conduit, means for dispersing the recirculated liquid into small drops, and means for mixing said drops with the steam and liquid mixture as the mixture passes through the upper end of said container.

RAYMOND R. HAUGH.